(12) United States Patent
Xu

(10) Patent No.: US 8,031,683 B2
(45) Date of Patent: Oct. 4, 2011

(54) SELECTING PORTALS TO SERVICE NETWORK TRANSMISSIONS

(75) Inventor: Xianchao Xu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/575,952

(22) PCT Filed: Dec. 22, 2006

(86) PCT No.: PCT/CN2006/003535
§ 371 (c)(1),
(2), (4) Date: Mar. 23, 2007

(87) PCT Pub. No.: WO2008/077268
PCT Pub. Date: Jul. 3, 2008

(65) Prior Publication Data
US 2009/0252126 A1  Oct. 8, 2009

(51) Int. Cl.
*H04W 4/00* (2009.01)
*H04L 12/28* (2006.01)
*H04L 12/56* (2006.01)
*H04B 7/00* (2006.01)

(52) U.S. Cl. ......... 370/338; 370/401; 370/408; 455/524

(58) Field of Classification Search ................ 455/524; 370/338, 401, 408
See application file for complete search history.

(56) References Cited

U.S. PATENT DOCUMENTS

| 6,549,786 B2 * | 4/2003 | Cheung et al. ................ 455/524 |
| 2004/0264379 A1 | 12/2004 | Srikrishna et al. |
| 2005/0195795 A1 * | 9/2005 | Aoki et al. .................... 370/351 |
| 2006/0245442 A1 | 11/2006 | Srikrishna et al. |
| 2006/0265480 A1 * | 11/2006 | Kim et al. ..................... 709/220 |
| 2008/0069068 A1 * | 3/2008 | Dean et al. .................... 370/342 |

FOREIGN PATENT DOCUMENTS

| CN | 1658588 A | 8/2005 |
| EP | 1821467 A1 | 8/2007 |

OTHER PUBLICATIONS

Office Action for CN Patent Application 200680056763.1, mailed Jan. 26, 2011, 22 pages.
Written Opinion of the International Searching Authority, date of issuance Sep. 20, 2007, for PCT/CN2006/003535, 5 pages.
International Preliminary Report on Patentability, date of issuance Jun. 23, 2003, for PCT/CN2006/003535, 6 pages.
International Search Report, date of mailing Oct. 18, 2007, for PCT/CN2006/003535, 2 pages.
Office Action, issued in EP Patent Application No. 06828429.8, mailed Mar. 24, 2011, 5 pages.
Sombrutzki et al., "Self-Organization in Community Mesh Networks, The Berlin Roofnet," IEEE First Workshop on Operator-Assisted (Wireless Mesh) Community Networks, Sep. 2006, pp. 1-11.

* cited by examiner

*Primary Examiner* — Marivelisse Santiago Cordero
(74) *Attorney, Agent, or Firm* — Schwabe, Williamson & Wyatt, P.C.

(57) ABSTRACT

A system, apparatus, and method to dynamically select and establish connections with portals of a mesh network are described herein.

16 Claims, 3 Drawing Sheets

SELECTING PORTALS TO SERVICE NETWORK TRANSMISSIONS

TECHNICAL FIELD

Embodiments of the present invention relate to the field of wireless networking, and, more specifically, to a method of dynamically selecting mesh portals within a wireless mesh network.

BACKGROUND

In recent years, wireless mesh networks have increased in popularity due in part to their decentralized infrastructure which allows such networks to remain relatively inexpensive and reliable. Their reliability stems from the interconnectivity between multiple nodes on the network. When a connection breaks down or is blocked, the multiple other connections allow reconfiguration by "hoping" from node to node until the destination is reached. This advantage coupled with the ease of deployment has led business networks to increasingly utilize the mesh infrastructure.

Within a mesh network, it is important that mesh nodes be allowed access to outside networks, the internet for example. This access is accomplished by enlisting the use of mesh portals. Mesh portals may have direct access to an outside network, and consequently, permit mesh nodes connecting to the mesh portals access to an outside network. Typically, mesh nodes are statically programmed with an address of a mesh portal on a network and continually access an outside network through the specific portal. This method of statically programming mesh nodes often leads to problems related to traffic and mobility.

Trafficking problems arise when a majority of the mesh nodes access an outside network through a single mesh portal leaving other mesh portals of the network relatively unused. This misallocation of mesh portals may serve to slow the overall speed and utility of the mesh network. Mobility problems arise when a mesh node moves away from its statically programmed portal. As a node moves further away, it may be required to either make an increased number of "hops" across other mesh nodes to reach its programmed portal or communicate directly with the mesh portal over a degraded direct communication link. As the length of the direct link or the number of hops increases, the efficiency and quality of the link decreases.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION OF EMBODIMENTS OF THE INVENTION

Figure 1:
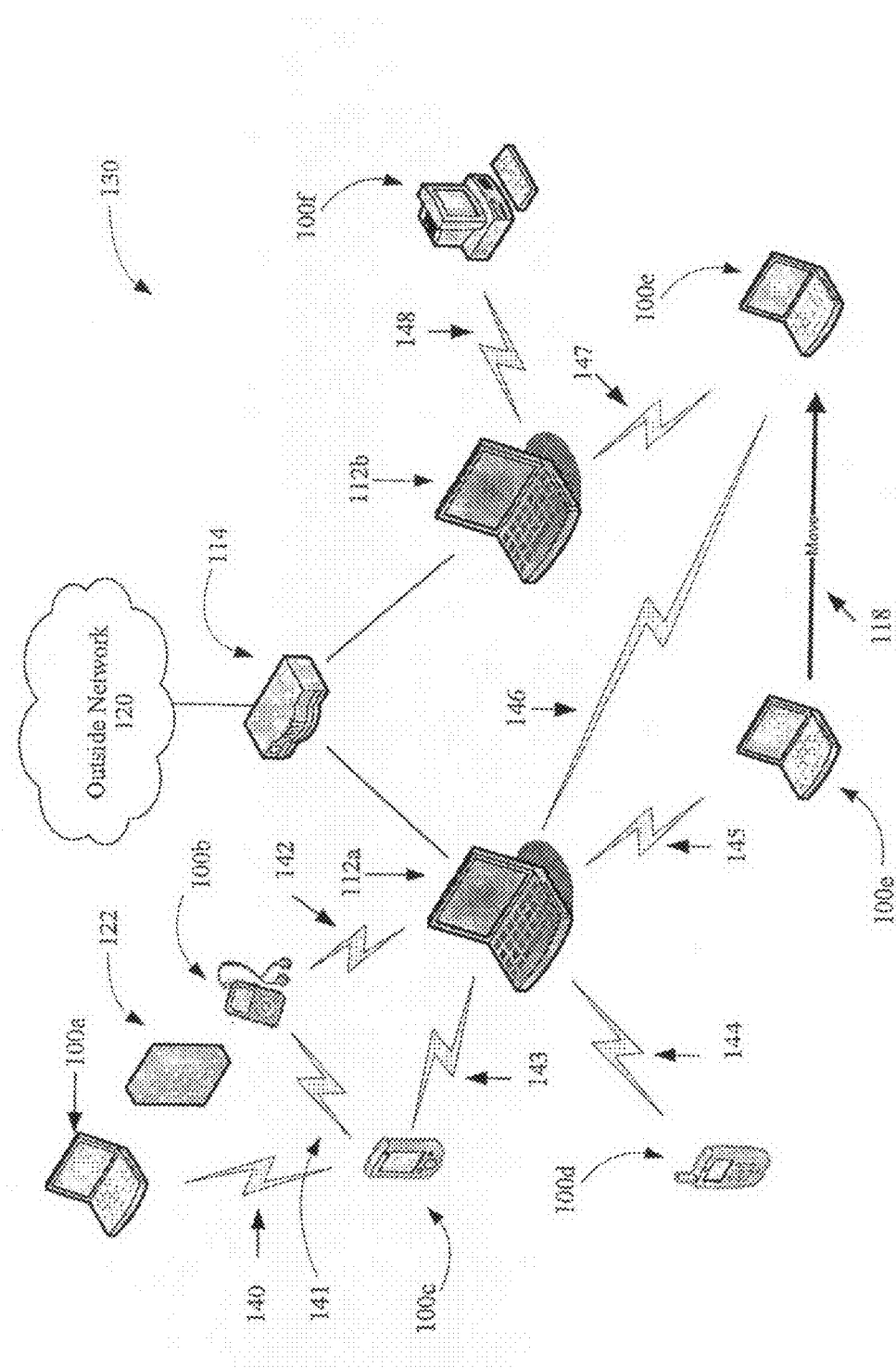
FIG. 1 illustrates a block diagram of an exemplary mesh network environment comprising different mesh nodes and including two mesh portals, in accordance with various embodiments of the present invention.

In the following detailed description, reference is made to the accompanying drawings which form a part hereof, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the description, a phrase in the form "A/B" means A or B. For the purposes of the description, a phrase in the form "A and/or B" means "(A), (B), or (A and B)". For the purposes of the description, a phrase in the form "at least one of A, B, and C" means "(A), (B), (C), (A and B), (A and C), (B and C), or (A, B and C)". For the purposes of the description, a phrase in the form "(A)B" means "(B) or (AB)" that is, A is an optional element.

Various embodiments, described below, have been developed in response to the current state of the art and, in particular, in response to the previously identified problems and factors associated with mesh networks that have not been solved by the currently available systems. Various embodiments, in accordance with the present invention, improve feasibility of mesh networks by providing more efficient network transmission.

Embodiments provide a method for a device (hereinafter "node") on a mesh network to dynamically select portals to service network transmission with outside networks. In various embodiments, the node may be adapted to receive a list containing the address of each portal located on its wireless mesh network. The node may then periodically measure the performance of connections between itself and each portal contained on the list using, in one embodiment, ad hoc on demand distance vector protocols ("AODV"). With indicators of the operational performance of each connection, the node may then select the most efficient connection to service network transmission. The measurement information, in addition to the metric values returned by the AODV protocols, may, in various embodiments, comprise information indicting distance to each portal from the current location of the node, or the amount of traffic attempting to establish communication or currently in communication with the selected portal.

For ease of understanding, the description will be in large part presented in the context of small or medium networks; however, the present invention is no so limited, and may be practiced in the context of larger mesh networks. Reference in the specification to a network "device" and/or "appliance" means that a particular feature, structure, or characteristic, namely device operable connectivity, such as the ability for the device to be connected or communicate across the network, and/or programmability, such as the ability for the device to be configured to perform designated functions, is included in at least one embodiment of the digital device or node as used herein. Typically, digital devices or nodes may include general and/or special purpose computing devices, connected personal computers, network printers, network attached storage devices, security cameras, media adapters, entertainment personal computers, and or other networked devices suitably configured for practicing the present invention in accordance with at least one embodiment.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Referring now to FIG. 1, a block diagram of an exemplary mesh network 130, in accordance with some embodiments, is illustrated. Specifically, mesh network 130 is formed by the interconnections created by the mesh nodes 100a-f and the mesh portals 112a and 112b. Mesh portals 112a-b are illustrated as being coupled to the various mesh nodes (e.g. 100a-f) and an outside network 120 via a router 114. In various embodiments, these connections enable the automatic discovery and use of all useable wireless paths between devices in a network and an outside or external network 120.

In one embodiment, mesh node 100a is connected with mesh node 100c by interconnection 140. Mesh node 100c is connected with mesh node 100b and mesh portal 112a by interconnections 141 and 143, respectively. Through the use of multi-hop, mesh node 100a may connect to either mesh portal 112a or mesh node 100b even when direct connections are not possible due to, in various embodiments, a connection failing or being obstructed, illustrated by wall 122.

In various embodiments, mesh nodes 100a-f may periodically measure the performance of connections 140-148 to mesh portals 112a-b. It is contemplated that the periodic measurements may be instigated manually or automatically. When one portal becomes more efficient than the portal currently being used, the node may establish a connection with the more efficient portal. In other embodiments, a node may notify a user of the more efficient portal and prompt for a decision to switch portals. For illustrative purposes, a typical mesh network 130 may have network nodes 100a-f connecting to two available mesh portals 112a-b, as shown. Further, mesh nodes 100a-f may be statically programmed to establish a link with only a specific portal of the network. In such a scenario, movement by the node may lengthen the distance necessary to communicate with a portal of the network. Specifically, node 100e may move to a second position as indicated by arrow 118. From this position, due to being statically programmed, node 100e will be required to communicate with the same portal 112a either by multi-hop, or simply communicating directly with portal 112a over a much a larger distance as seen by connection 146.

Figure 2:
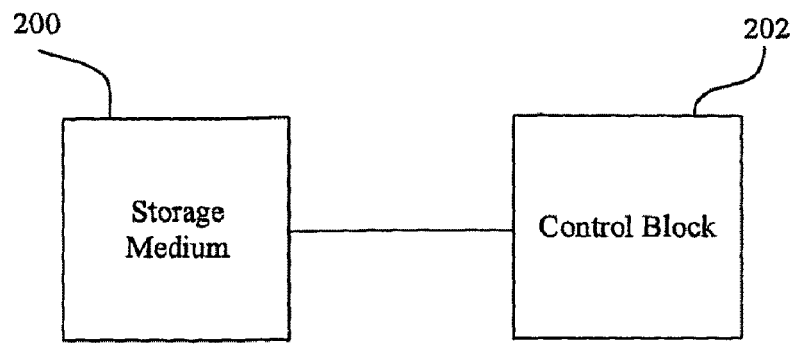
FIGS. 2-3 illustrate block diagram views of exemplary mesh nodes in accordance with various embodiments.
Figure 3:
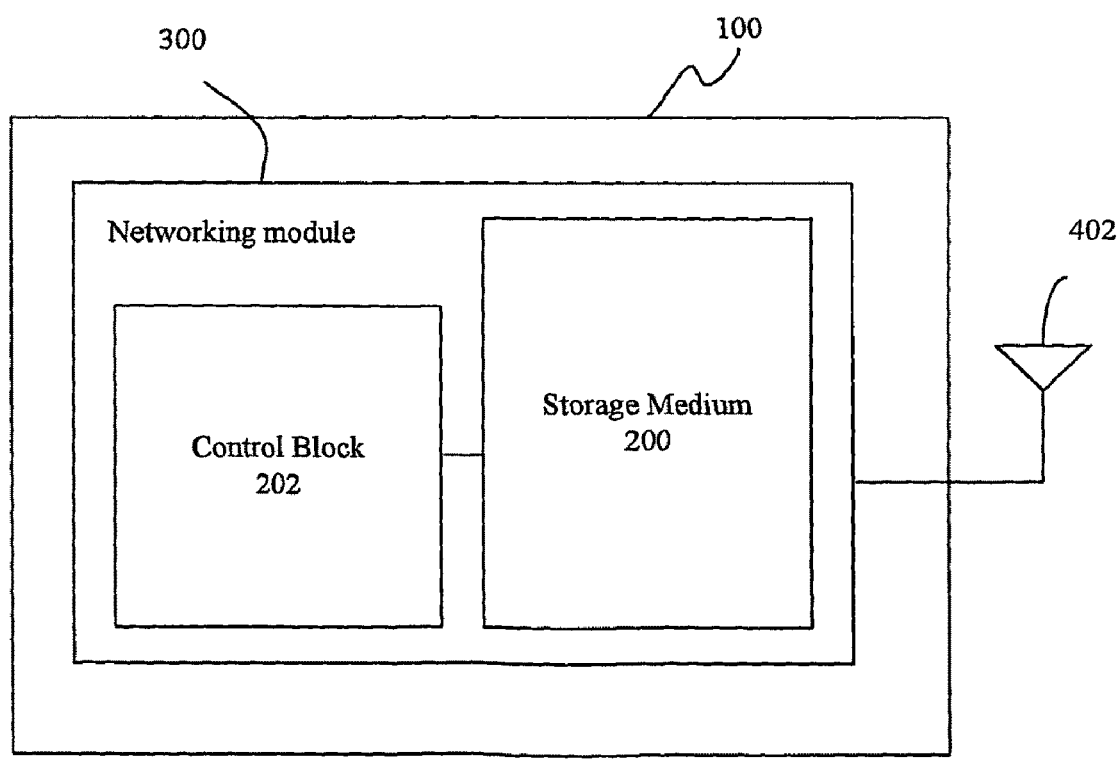

In accordance with one embodiment, nodes incorporating the platform described in greater detail in FIGS. 2 and 3 may be configured to dynamically select a more efficient connection. In the above illustration, a node 100e which has moved to a second position, along arrow 118, may dynamically establish connections with each portal of network 130, namely portals 112a-b over connections 146 and 147. The node, in various embodiments, may then collect information pertaining to the operational performance of each connection. Such information may be the result of utilizing protocols known in the art, such as AODV which return a metric value associated with each connection. In other embodiments, the information may be obtained using other protocols and return information pertaining to qualities of operational performance such as the distance between the mesh node and the specific mesh portal, or alternatively, the amount of other mesh nodes communicating with the specific mesh portal. In the previous illustration, connection 146 would not be as efficient as connection 147 due to the distance between the node and the portal, and additionally, the number of nodes accessing portal 112a. Consequently, node 100e, at a second position, may dynamically select portal 112b to service network transmission with outside network 120 through router 114.

Referring now to FIGS. 2 and 3, block diagrams of host platforms 100a-f are shown in accordance with various embodiments. The system includes storage medium 200 coupled to control block 202. In various embodiments, the control block 202 and the storage medium 200 may be integrated into a networking module 300 which is further coupled to an antenna structure 402 to provide access to other devices of the network 130. In various embodiments, antenna structure 402 may include an omnidirectional antenna.

In one embodiment, storage medium 200 may include semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, memory 200 may comprise other and/or later-developed types of computer readable memory. Machines-readable firmware program instructions may be stored in memory 200. In one embodiment, storage medium 200 may be used to store identification information comprising, but not limited to, the address of each portal of the network. The address being any information capable of allowing a node to locate a portal, such as, in one embodiment, an internet protocol address.

In various embodiments, the control block 202 is designed to collect performance information pertaining to the plurality of links correspondingly linking the device to a plurality of portals. In various embodiments the performance information may include or be based on information relating to the distance of the mesh node from the mesh portal, or the amount of traffic on each portal. This information, may be collected by utilizing protocols known in the art, such as AODV. In one embodiment, information may be obtained by a mesh node broadcasting a route request packet ("RREQ") to every portal on a network 130.

Figure 4:
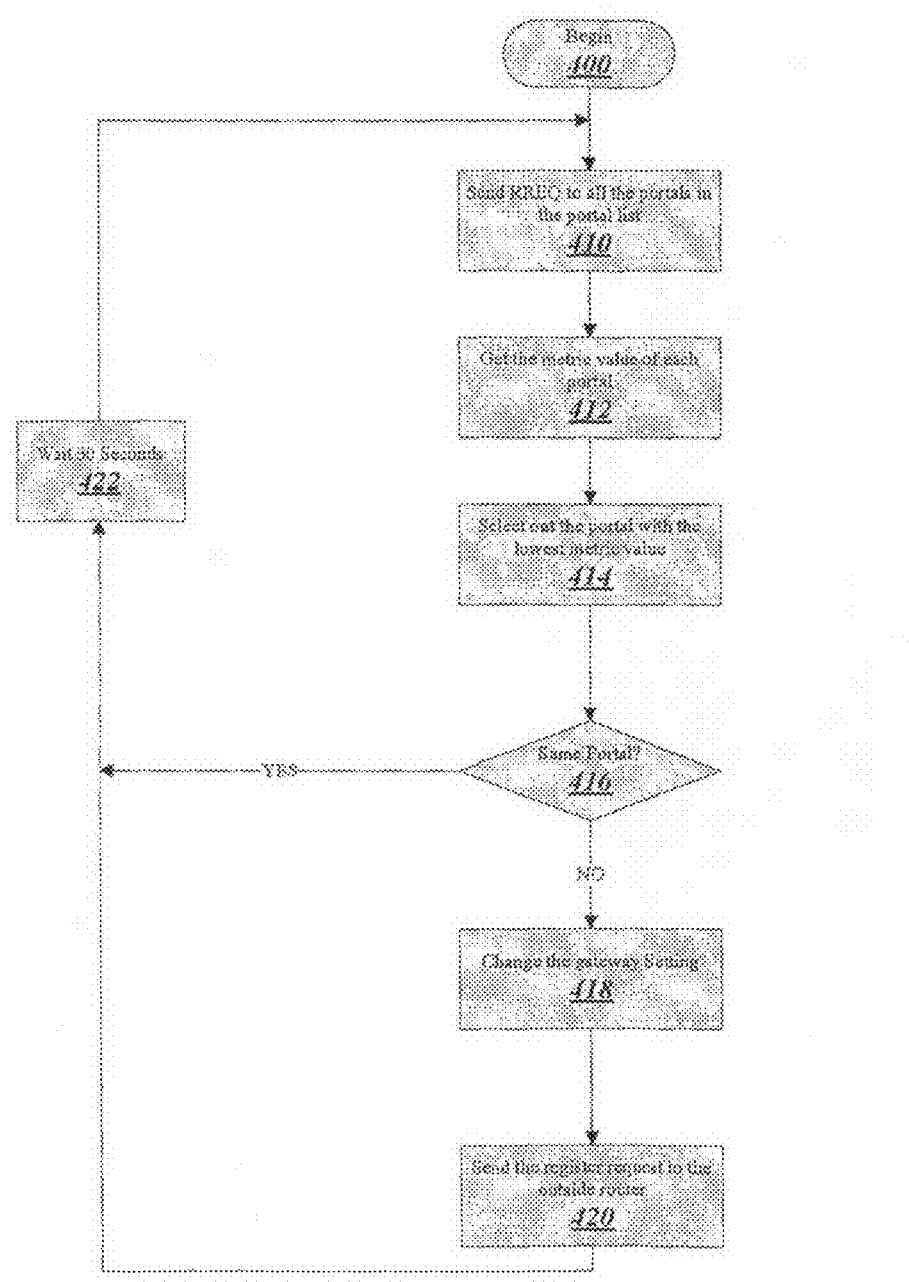
FIG. 4 illustrates a flow diagram view of a portion of the operations of a mesh node as presented in FIG. 3 in further detail, in accordance with various embodiments.

Referring now to FIG. 4, methods, in accordance with various embodiments, are described in terms of computer firmware, software, and hardware with reference to a flow diagram. In various embodiments, portions of the operations to be performed by a host platform device may constitute state machines or computer programs made up of computer-executable instructions. These instructions are typically maintained in a storage medium accessible by the host platform device and/or remote devices.

A machine-accessible medium or storage medium includes any mechanism that provides (i.e., stores and/or transmits) information in a form readable by a machine (e.g. a computer). For example, a storage medium includes read only memory ("ROM"), random access memory ("RAM"), magnetic disk storage media, optical storage media, flash memory devices, electrical, optical, acoustical or other form of propagated signals (e.g., carrier waves, infrared signals, digital signals), and the like.

Describing the methods by reference to a flow diagram enables one skilled in the art to develop such programs, including instructions to carry out the methods on suitably configured host platforms and/or remote devices. In various embodiments, at least one of the processors of a suitably configured host platform and/or remote device executes the instructions from the storage medium. In various embodiments, the computer-executable instructions may be written in a computer programming language or may be embodied in firmware logic, reconfigurable logic, a hardware description language, a state machine, an application-specific integrated circuit, or combinations thereof. If written in a programming language conforming to a recognized standard, such instructions may be executed on a variety of hardware platforms and may interface with a variety of operating systems.

The present various embodiments are not described with reference to any particular programming language. It will be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a network device causes the processor of the computer to perform an action or produce a result.

Referring to FIG. 4, in accordance with various embodiments, a flow diagram of the operations of a host platform are shown. In one embodiment, at block 410, the host platforms 100a-f transmit route requests ("RREQ") to all the portals of network 130. As described earlier, host platform 100a may have addresses of the portals pre-stored, and retrieve them for transmission of the RREQ requests. At block 412, the host platform then receives a metric value from each portal describing the quality of the operational performance between the node and the portal. At block 414, the node may then select the portal with the lowest metric value, as returned by an AODV protocol, signifying the most efficient link. At block 416, the node will determine if the selected portal is the same one currently being used, if it is, the node may wait 30 seconds at block 422, and begin the monitoring process again. If the portal is a different portal, the node proceeds to block 418 where the node may, in one embodiment, change the gateway setting on the node. The node may then send a register request to the outside router at block 420. In various embodiments, the register request contains the information of the mesh node and the selected mesh portal. The router is then able to update the route table using the new portal as the next-hop for the mesh node. The mesh node may then wait 30 seconds at block 422 and once again begin monitoring for more efficient portals.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method, comprising:
   transmitting, by a node within a network, a plurality of route requests to a plurality of portals of the network;
   receiving, by the node, a plurality of route responses to the plurality of route requests, respectively, the plurality of route responses include operational performance information pertaining to a plurality of links correspondingly linking the node to the plurality of portals;
   selecting, by the node, one of the portals to service network transmission between the node and another network external to the network, based at least in part on the operational performance information received;
   transmitting, by the node, a register message comprising address information of the node and the selected portal to a router associated with the external network to facilitate network transmission between the node and the external network if the selected portal is different from a current portal, the router being distinct from the plurality of portals; and
   regularly repeating the transmitting, receiving, selecting and conditional transmitting by the node after each elapse of a time period.

2. The method of claim 1, wherein the transmitting comprises employing ad hoc on-demand distance vector protocols to effect the operational performance information.

3. The method of claim 1, wherein the operational performance information comprises information pertaining to the distance of the node from the plurality of portals of the network.

4. The method of claim 1, wherein the operational performance information comprises information pertaining to the amount of traffic on each portal of the plurality of portals of the network.

5. An apparatus, comprising:
   a storage medium to store identification and operational performance information, the identification information identifying a plurality of portals of a network comprising the portals and a device hosting the apparatus, and the performance information pertaining to a plurality of links correspondingly linking the apparatus to the plurality of portals; and
   a control block coupled to the storage medium configured to
      transmit a plurality of route requests to the plurality of portals;
      receive a plurality of route responses to the plurality of route requests, respectively, the plurality of route responses including the operational performance information based, at least in part, on the stored identification information,
      select one of the portals to service network transmission between the device and another network external to the network based, at least in part, on the stored performance information,
      cause the apparatus to transmit a register message comprising address information of the node and the selected portal to a router associated with the external network to facilitate network transmission between the device and the external network if the selected portal is different from a current portal, the router being distinct from the plurality of portals, and
      wherein the control block is further configured to regularly repeat the transmit of the plurality of router requests, receive of operational performance information, select of one of the portals and cause the conditional transmit after each elapse of a time period.

6. The apparatus of claim 5, wherein the control block is further configured to employ ad hoc on-demand distance vector protocols to effect the operational performance information.

7. The apparatus of claim 5, wherein the operational performance information comprises information pertaining to the distance of the device from the plurality of portals on the network.

8. The apparatus of claim 5, wherein the operational performance information comprises information pertaining to the amount of traffic on each portal of the plurality of portals of the network.

9. An article of manufacture, comprising:
a machine-accessible non-transitory storage medium; and
a plurality of programming instructions stored on the storage medium and designed to enable a device, in response to execution of the programming instructions by the device, to:
retrieve a plurality of addresses of a plurality of portals of a network comprising the portals and the device;
transmit a plurality of route requests to the portals to facilitate gathering of operational performance information pertaining to a plurality of links correspondingly linking the device to the portals for selection of one of the portals to service network transmission between the device and another network external to the network,
select one of the portals to service network transmission between the device and the external network based, at least in part, on the operational performance information
transmit a register message comprising the address of the device and the selected portal to a router associated with the external network to facilitate network transmission between the device and the external network if the selected portal is different from a current portal, the router being distinct from the plurality of portals, and
wherein the programming instructions are further designed to enable the device to transmit the route requests, select one of the portals, and conditionally transmit after each elapse of a time period.

10. The article of manufacture of claim 9, wherein the programming instructions are further designed to enable the device, in response to execution of the programming instructions by the device, to employ ad hoc on-demand distance vector protocols to effect the operational performance information.

11. The article of manufacture of claim 9, wherein the operational performance information comprises information pertaining to the distance of the device from the plurality of portals of the network.

12. The article of manufacture of claim 9, wherein the operational performance information comprises information pertaining to the amount of traffic on each portal of the plurality of portals of the network.

13. A system comprising:
an omnidirectional antenna;
a networking module coupled to the antenna the networking module having:
a storage medium to store identification and operational performance information, the identification information identifying a plurality of portals of a network, comprising the portals and a device hosting the networking module, and the performance information pertaining to a plurality of links correspondingly linking the device to the plurality of portals; and
a control block coupled to the storage medium configured to
transmit a plurality of router requests to the plurality of portals to facilitate collection of the performance information based, at least in part, on the stored identification information,
to select one of the portals to service network transmission between the device and another network external to the network based, at least in part, on the stored performance information
to cause the system to transmit a register message comprising address information of the node and the selected portal to a router associated with the external network to facilitate network transmission between the device and the external network if the selected portal is different from a current portal, the router being distinct from the plurality of portals,
wherein the control block is further configured to collect performance information, select one of the portals and conditionally cause the transmit after each elapse of a time period.

14. The system of claim 13, wherein the control block is further configured to employ ad hoc on-demand distance vector protocols to effect the operational performance.

15. The system of claim 13, wherein the operational performance information comprises information pertaining to the distance of the device from the plurality of portals on the network.

16. The system of claim 13, wherein the operational performance information comprises information pertaining to the amount of traffic on each portal of the plurality of portals of the network.

* * * * *

UNITED STATES PATENT AND TRADEMARK OFFICE
CERTIFICATE OF CORRECTION

| | | |
|---|---|---|
| PATENT NO. | : 8,031,683 B2 | Page 1 of 1 |
| APPLICATION NO. | : 11/575952 | |
| DATED | : October 4, 2011 | |
| INVENTOR(S) | : Xianchao Xu | |

It is certified that error appears in the above-identified patent and that said Letters Patent is hereby corrected as shown below:

IN THE CLAIMS:

Col. 7, claim 9, line 18, "least in part, on the operational performance information" should read --"least in part, on the operational performance information,"--

Col. 8, claim 13, line 12, "a control block coupled to the storage medium configured to" should read --"a control block coupled to the storage medium configured to:"--

Col. 8, claim 13, line 20, "performance information" should read --"performance information,"--

Signed and Sealed this
Sixth Day of November, 2012

David J. Kappos
*Director of the United States Patent and Trademark Office*